US009794624B2

United States Patent
Morris et al.

(10) Patent No.: US 9,794,624 B2
(45) Date of Patent: *Oct. 17, 2017

(54) MEDIA STREAM GENERATION BASED ON A CATEGORY OF USER EXPRESSION

(71) Applicant: AT&T INTELLECTUAL PROPERTY I, L.P., Atlanta, GA (US)

(72) Inventors: Nadia Morris, Pacifica, CA (US); Dale Malik, Dunwoody, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,979

(22) Filed: Feb. 1, 2016

(65) Prior Publication Data

US 2016/0150277 A1    May 26, 2016

Related U.S. Application Data

(63) Continuation of application No. 14/539,610, filed on Nov. 12, 2014, now Pat. No. 9,288,537, which is a (Continued)

(51) Int. Cl.
*H04N 21/442* (2011.01)
*H04N 21/472* (2011.01)
(Continued)

(52) U.S. Cl.
CPC ....... *H04N 21/44218* (2013.01); *H04L 65/60* (2013.01); *H04N 7/17336* (2013.01); *H04N 21/252* (2013.01); *H04N 21/26603* (2013.01); *H04N 21/4223* (2013.01); *H04N 21/437* (2013.01); *H04N 21/438* (2013.01);
(Continued)

(58) Field of Classification Search
CPC ....... H04N 21/44218; H04N 21/47217; H04N 21/438; H04N 21/437; H04N 21/472; H04N 7/17336; H04N 21/26603; H04N 21/8456; H04N 21/4223; H04N 21/84; H04N 21/44204; H04N 21/252; H04N 21/6582; H04N 21/44213; H04L 65/60
See application file for complete search history.

(56) References Cited

U.S. PATENT DOCUMENTS

6,585,521 B1    7/2003  Obrador
2002/0053078 A1    5/2002  Holtz et al.
(Continued)

*Primary Examiner* — Benjamin R Bruckart
*Assistant Examiner* — Akshay Doshi
(74) *Attorney, Agent, or Firm* — Toler Law Group, PC (57) ABSTRACT

A method includes receiving, at a user device from a media server, a media stream that includes a group of segments of media content associated with a user-selected category. The group of segments includes a first segment corresponding to a portion of a first program and a second segment corresponding to a portion of a second program. The method also includes receiving, at the user device, user input during playback of the media stream, the user input indicating the first segment. The method also includes sending data based on the user input to the media server. The method further includes receiving, at the user device from the media server, a modified stream based on the user input. The first segment is replaced by an entirety of the first program in the modified stream.

20 Claims, 10 Drawing Sheets

Related U.S. Application Data continuation of application No. 12/209,381, filed on Sep. 12, 2008, now Pat. No. 8,925,001.

(51) Int. Cl.

| | |
|---|---|
| *H04N 21/438* | (2011.01) |
| *H04N 21/437* | (2011.01) |
| *H04N 21/845* | (2011.01) |
| *H04N 21/25* | (2011.01) |
| *H04L 29/06* | (2006.01) |
| *H04N 21/84* | (2011.01) |
| *H04N 21/266* | (2011.01) |
| *H04N 21/4223* | (2011.01) |
| *H04N 21/658* | (2011.01) |
| *H04N 7/173* | (2011.01) |

(52) U.S. Cl.
CPC . *H04N 21/44204* (2013.01); *H04N 21/44213* (2013.01); *H04N 21/472* (2013.01); *H04N 21/47217* (2013.01); *H04N 21/6582* (2013.01); *H04N 21/84* (2013.01); *H04N 21/8456* (2013.01)

(56) References Cited

U.S. PATENT DOCUMENTS

| | | |
|---|---|---|
| 2003/0188321 A1 | 10/2003 | Shoff et al. |
| 2003/0197785 A1* | 10/2003 | White ............... G11B 27/034 348/207.99 |
| 2005/0071865 A1 | 3/2005 | Martins |
| 2005/0165941 A1* | 7/2005 | Eytchison ......... H04N 7/17318 709/231 |
| 2005/0183120 A1* | 8/2005 | Jain ................... H04N 7/17336 725/46 |
| 2006/0218573 A1 | 9/2006 | Proebstel |
| 2008/0031590 A1 | 2/2008 | Kulas |
| 2008/0091512 A1 | 4/2008 | Marci et al. |
| 2008/0189733 A1 | 8/2008 | Apostolopoulos |
| 2009/0019467 A1 | 1/2009 | Kim |
| 2009/0077170 A1* | 3/2009 | Milburn ............. G06F 19/3425 709/203 |

* cited by examiner

MEDIA STREAM GENERATION BASED ON A CATEGORY OF USER EXPRESSION

PRIORITY CLAIM

This application is a continuation of, and claims priority to, U.S. patent application Ser. No. 14/539,610, filed Nov. 12, 2014, which claims priority to U.S. Pat. No. 8,925,001, filed Sep. 12, 2008, each of which is hereby incorporated by reference in its entirety.

FIELD OF THE DISCLOSURE

The present disclosure relates generally to media stream generation based on a category of user expression.

BACKGROUND

Television has historically been primarily a one-way communication medium. Television content has traditionally been determined by content providers based on aggregated user viewing statistics, such as Nielsen ratings, and TV has been delivered to broadcast viewers via satellite, cable or airway broadcasts. More recently, content providers have also provided content via interactive television signals using packet-switched networks that may enable viewers to respond to, or interact with, the content. However, even interactive television systems are used to distribute media content selected by content providers.

Communications service providers are expanding into new markets and new types of services and the ability to deliver a high-quality television offering has become increasingly important. Many service providers are transitioning from their prior role of access providers to entertainment experience providers. In addition, many service providers now deliver an increased range of video, voice, and data services to devices, both inside and outside the home. However, television viewers that desire to view particular types or categories of television content may become dissatisfied with distributed content that is limited by content providers.

DETAILED DESCRIPTION OF THE DRAWINGS

Systems and method of media stream generation based on categories of user expression are disclosed. In a particular embodiment, a method is disclosed that includes receiving input selecting at least one category from a plurality of categories of expression. Each of the categories is descriptive of a type of expression made by users as media content is presented. For example, the categories may include horror, humor, sporting events, or other categories. The method also includes selecting a group of segments of media content. Each of the segments of media content is associated with the selected category. The method further includes creating a stream of media content that includes each of the segments of media content in the group. The stream of media content may therefore provide content that is associated with the selected category.

In another embodiment, an apparatus is disclosed that includes a processor and a memory accessible to the processor. The memory includes a plurality of user expressions made in response to presentation of segments of media content. Each expression is time indexed to a corresponding portion of the media content. The memory includes a plurality of categories of types of expression, where each expression is associated with one or more of the categories. The apparatus also includes an interface to receive input selecting one or more of the categories. The processor creates a stream of media content that includes segments of the media content that are associated with the selected category in response to the input.

In another embodiment, a computer-readable medium is disclosed that includes instructions that, when executed by a processor, cause the processor to access a database including user expression data related to media content. The user expression data includes user expressions associated with different categories of expression. The instructions also cause the processor to generate a stream of media content including segments of the media content that are associated with a selected category of expression. In a particular embodiment, the segments are associated with the selected category of expression when a threshold number of user expressions are associated with the selected category.

In another embodiment, the computer-readable medium includes instructions that, when executed by a processor, cause the processor to receive input selecting at least one category from a plurality of categories of expression. Each of the categories is descriptive of a type of expression of a user in response to presentation of a segment of media content. The instructions also cause the processor to select an advertisement based at least partially on the selected category and to create a stream of media content that includes the advertisement and segments of media content associated with the selected category.

Figure 1:
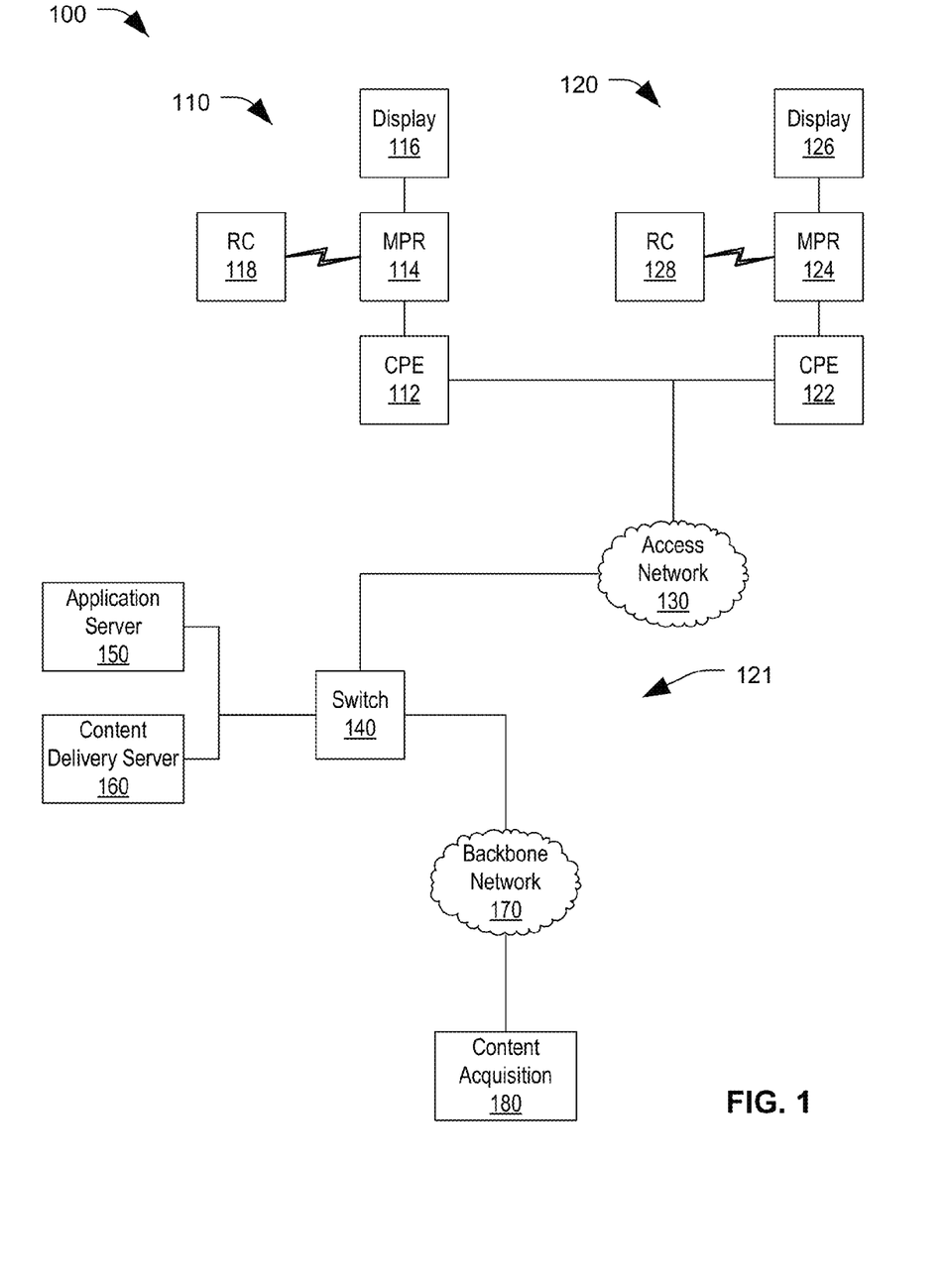
FIG. 1 is a block diagram of selected elements of a multimedia content distribution network.

FIG. 1 is a block diagram illustrating selected elements of a first embodiment of a multimedia content delivery network 100. The depicted embodiment of the multimedia content delivery network 100 includes functionality to facilitate collaborative annotating of a multimedia content stream and enhanced navigation of annotated streams based on the annotations. Although multimedia content is not limited to television, video-on-demand, or pay-per-view programs, the depicted embodiments of multimedia content delivery network 100 and its capabilities are described herein with reference to these types of multimedia content, which are interchangeably referred to herein as multimedia content program(s), multimedia programs, or simply, programs.

The elements of the multimedia content delivery network 100 illustrated in FIG. 1 emphasize the network's functionality for delivering multimedia content to one or more subscribers. As depicted in FIG. 1, the multimedia content delivery network 100 includes one or more clients 110 and 120, where each client may represent a different subscriber, and a service provider 121 that encompasses resources to acquire, process, and deliver programs to clients, such as representative clients 110 and 120. Clients 110, 120 and service provider 121 are demarcated by an access network 130 to which the clients 110, 120 and the service provider 121 are connected. In some embodiments, the access network 130 is an Internet Protocol (IP) network, while in other embodiments, the access network 130 may be implemented as a conventional coaxial-based network. In IP network implementations of the access network 130, the access network 130 may employ a physical layer of unshielded twisted pair cables, fiber optic cables, or both. As an example, the multimedia content delivery network 100 may employ digital subscriber line (DSL) compliant twisted pair connections between the clients 110, 120 and a node (not depicted) in the access network 130, while fiber cable or other broadband cable connects service provider resources to one or more nodes in the access network 130. In other embodiments, the broadband cable may extend all the way to the clients 110 and 120.

The client 110 depicted in FIG. 1 includes a network appliance identified as customer premises equipment (CPE) 112 that connects to the access network 130 and to a multimedia processing resource (MPR) 114. The CPE 112 may supply routing, firewall, or other services for the clients 110. CPE 112 may include elements of a broadband modem such as an asynchronous DSL (ADSL) modem as well as elements of a local area network (LAN) access point that supports a LAN to which the MPR 114 connects, such as an Ethernet compliant LAN, also referred to as an IEEE 811 LAN. The client 110, as depicted in FIG. 1, further includes a display device or a display 116. A remote control 118 of the client 110 is operable to communicate wirelessly to the MPR 114 using infrared or radio frequency signals. MPR 114 may receive input via buttons (not depicted) located on side panels of MPR 114. The client 120 depicted in FIG. 1 includes a network appliance identified as CPE 122 that connects to the access network 130 and to a MPR 124. The CPE 122 may supply routing, firewall, or other services for the clients 120. CPE 122 may include elements of a broadband modem such as an ADSL modem as well as elements of a LAN access point that supports a LAN to which the MPR 124 connects, such as an Ethernet compliant LAN. The client 120, as depicted in FIG. 1, further includes a display device or a display 126. A remote control 128 of the client 120 is operable to communicate wirelessly to the MPR 124 using infrared or radio frequency signals. MPRs 124 may receive input via buttons (not depicted) located on side panels of MPRs 124.

Figure 2:
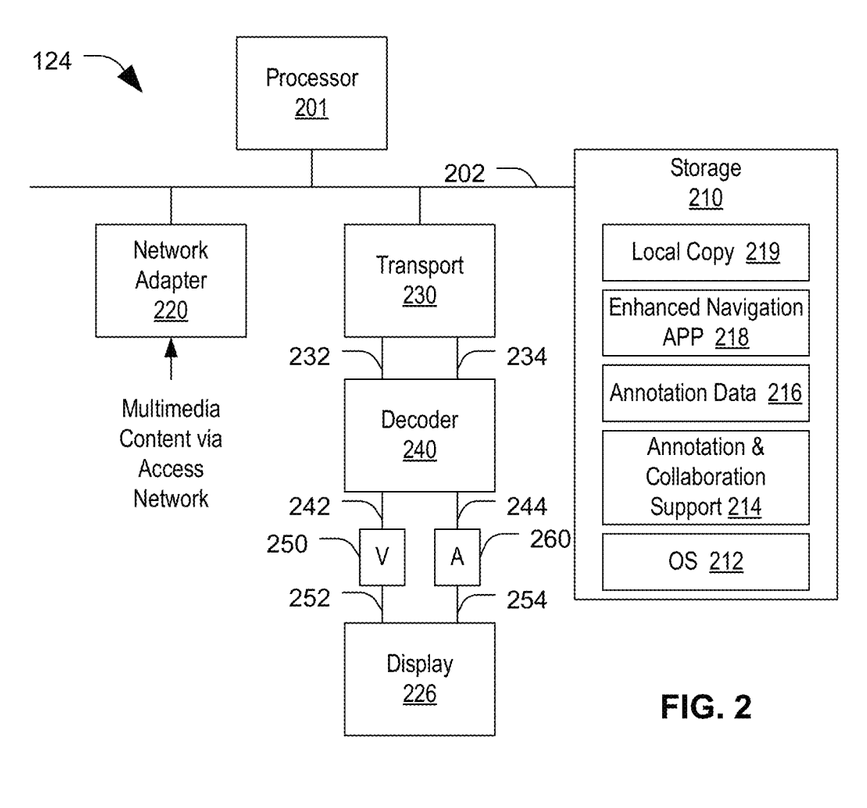
FIG. 2 is a block diagram of selected elements of an embodiment of a multimedia processing resource suitable for supporting a collaborative annotation application.

Each MPR 114, 124 may be implemented as a stand-alone set top box suitable for use in a co-axial or IP-based multimedia content delivery network. In other embodiments, the MPR 124 may be integrated with the display 126, with the CPE 122, or both. Referring to FIG. 2, a block diagram illustrating selected elements of the MPR 124 is presented. In the depicted embodiment, the MPR 124 includes a processor 201 coupled to a storage media collectively identified as storage 210, via a shared bus 202. The storage 210 encompasses persistent and volatile media, fixed and removable media, and magnetic and semiconductor media. The storage 210 is operable to store instructions, data, or both. The storage 210, as shown, includes multiple sets or sequences of instructions, namely, an operating system 212, an application program identified as annotation and collaboration support 214, and an application program identified as an enhanced navigation application 218.

The operating system 212 may be a Unix® or Unix-like operating system, a Windows® family operating system, or another suitable operating system. The annotation and collaboration support 214 may operate in conjunction with an annotation application, which may be hosted on an application server or a content delivery server of the service provider 121, to facilitate collaborative annotation of a program of multimedia content. The enhanced navigation application 218 may include instructions to implement annotation based navigation of annotated programs and may further include instructions to support criteria based identification of desired locations within an annotated program.

The implementation of the MPR 124 depicted in FIG. 2 includes a data structure identified as annotation data 216 and a data structure identified as a local copy 219, which represents a copy of the program of multimedia content. The annotation data 216 includes data that represents or is otherwise indicative of annotations created using the collaborative annotation application 330 and the annotation and collaboration support 214, as described herein. In this embodiment, the annotation data 216 is maintained as a data structure that is separate and distinct from the program to which the annotation data corresponds. In this implementation, the annotation data 216 may be freely exchanged among users within a defined group independent of the underlying program. Each user may download or otherwise acquire a resident copy of a program, an example of which is illustrated in FIG. 2 as the local copy 219. Thereafter, the annotation may be transferred or accessed as needed to reflect additions or other modifications to the annotation data 216.

The MPR 124 as depicted in FIG. 2 further includes a network adapter 220 that interfaces the MPR 124 to the LAN, through which the MPR 124 receives multimedia content. In embodiments suitable for use in IP based content delivery networks, the MPR 124, as depicted in FIG. 2, may include a transport unit 230 that assembles the payloads from a sequence or set of network packets into a stream of multimedia content. In coaxial based access networks, content may be delivered as a stream that is not packet-based and it may not be necessary in these embodiments to include the transport unit 230. In a co-axial implementation, the clients 120 may require tuning resources (not explicitly depicted in FIG. 1) to "parse" desired content from other content that is delivered over the coaxial medium simultaneously and these tuners may be provided in the MPRs 124. The stream of multimedia content received by the transport unit 230 may include audio information and video information, and the transport unit 230 may parse or segregate the information to generate a video stream 232 and an audio stream 234 as shown.

The video and audio streams 232 and 234, as output from the transport unit 230, may include audio or video information that is compressed, encrypted, or both. A decoder unit 240 is shown as receiving the video and audio streams 232 and 234 and generating native format video and audio streams 242 and 244. The decoder 240 may employ any of various widely distributed video decoding algorithms including any of the Motion Pictures Expert Group (MPEG) standards and the Windows Media Video (WMV) standards including WMV 9, which has been standardized as Video Codec-1 (VC-1) by the Society of Motion Picture and Television Engineers. Similarly, the decoder 240 may employ any of various audio decoding algorithms including Dolby® Digital, Digital Theatre System (DTS) Coherent Acoustics and Windows Media Audio (WMA).

The native format video and audio streams 242 and 244 as shown in FIG. 2, may be processed by encoders/digital-to-analog converters (encoders/DACs) 250 and 260 respectively, to produce analog video and audio signals 252 and 254 in a format compliant with the display 226, which itself may not be a part of the MPR 124. The display 226 may comply with a National Television Systems Committee (NTSC), Phase Alternating Line (PAL) or any other suitable television standard.

Returning to FIG. 1, the selected elements representing the service provider 121 include content acquisition resources 180 connected to a switch 140 via a backbone network 170. An application server 150 and a content delivery server 160 are also shown connected to the switch 140. The switch 140 may provide firewall and routing functions to demarcate the access network 130 from the resources of the service provider 121. The switch 140 may be housed in a central office or other facility of the service provider 121. In embodiments that employ DSL compliant connections, the switch 140 may include elements of a DSL Access Multiplexer (DSLAM) that multiplexes many subscriber DSL lines to the backbone network 170. The backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and video-on-demand content.

Acquired content is provided to a content delivery server 160 via the backbone network 170 and the switch 140. Content may be delivered from the content delivery server 160 to the clients 120 via the switch 140 and the access network 130. Content may be compressed, encrypted, modulated, demodulated, and otherwise encoded or processed at the content acquisition resources 180, the content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of the multimedia content delivery network 100 may include content acquisition resources in regional offices that are connected to the switch 140.

Although the service provider 121 is depicted in FIG. 1 as having a single switch 140 to which the content acquisition resources 180, the content delivery server 160, and the application server 150 are connected, other embodiments may employ different switches for each of these functional components and may include additional functional components not depicted in FIG. 1 including, for example, operational subsystem support (OSS) resources.

FIG. 1 illustrates the application server 150 connected to the switch 140. The application server 150 may host or otherwise implement one or more applications for the multimedia content delivery network 100. Applications provided by the application server 150 may be downloaded and hosted on other network resources including, for example, the content delivery server 160, the switch 140, the CPE 122, and/or the MPR 124.

Figure 3:
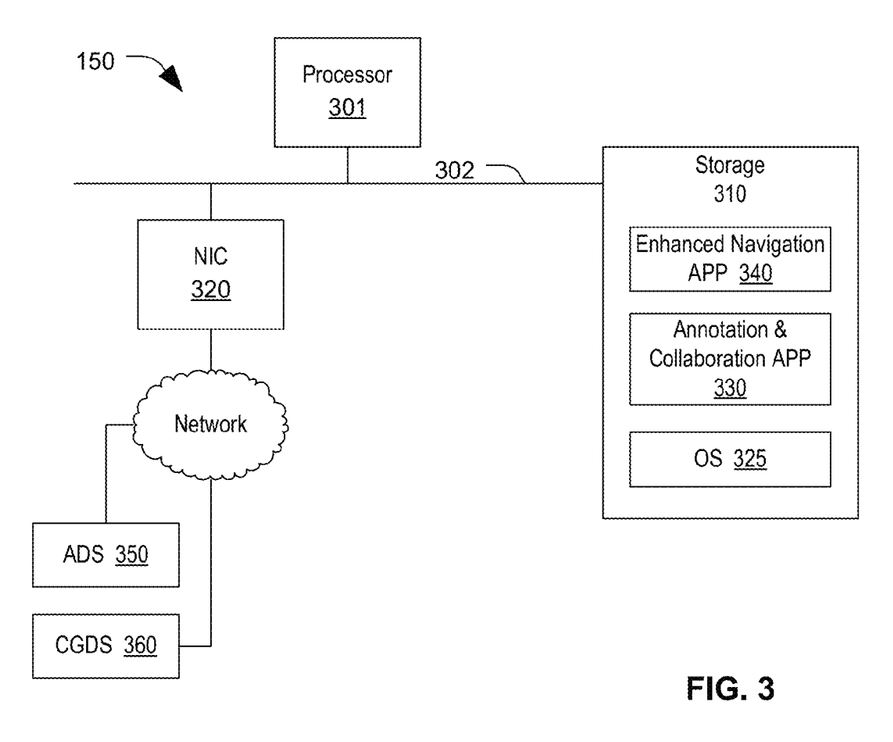
FIG. 3 is a block diagram of selected elements of an embodiment of a server suitable for hosting a collaborative content annotation application.

Referring to FIG. 3, a block diagram depicts selected elements of an embodiment of the application server 150 including support for collaborative annotation as described herein. In the depicted embodiment, the application server 150 includes at least one processor 301 that is operable to access storage 310 via a shared bus 302. A network interface card (NIC) 320 connects to the shared bus 302 and supports communication between the processor 310 and network connected resources.

Some embodiments of the multimedia content distribution multimedia content delivery network 100 as described herein include functionality that supports collaborative annotation of multimedia content programs and enhanced, annotation-based navigation of annotated programs.

In the depicted embodiment, the storage 310 of the application server 150 includes instructions that define an operating system 325, a collaborative annotation application 330, and an enhanced navigation application 340. As depicted in FIG. 3, the application server 150 has networked access to remote data structures including an annotation data structure 350 and a collaboration group data structure 360 that may be used in conjunction with the collaborative annotation application 330. In other embodiments, the data represented by the data structures 350 and/or 360 may be included within the storage 310.

Figure 4:
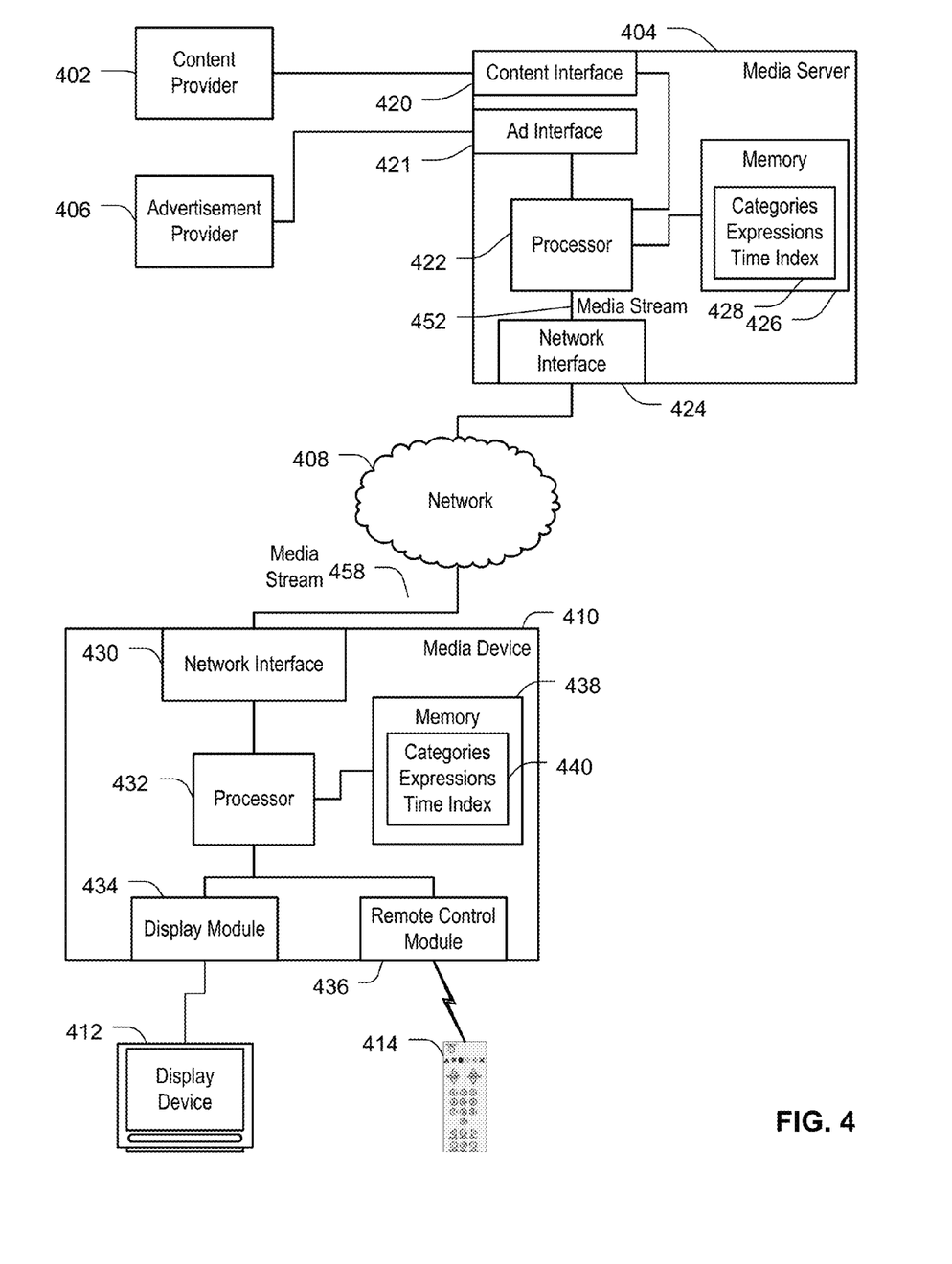
FIG. 4 depicts a block diagram of a particular embodiment of a system to facilitate interactions between users with respect to a media stream.

FIG. 4 depicts a particular embodiment of a system to facilitate interactions between users with respect to a media stream. The system includes a media server 404 coupled to a content provider 402 and adapted to provide a media stream 458 via a network 408 to a representative media device 410. In a particular embodiment, the media server 404 includes elements of one or more of the application server 150 and the content delivery server 160, of FIG. 1, and the media device 410 is the MPR 124 of FIGS. 1-2. The media device 410 may be coupled to a display device 412 to provide a display at the display device 412 that includes display of the media stream 458. In a particular embodiment, the media device 410 is a set-top box device, such as an Internet Protocol television (IPTV) set-top box device, a video gaming device or console, a personal computer or other computing device that is adapted to emulate set-top box device functionalities, any other device adapted to receive content and transmit data to an media system via a network, or any combination thereof. For example, the media device 410 may include a memory 438 adapted to record portions of the media stream 458. In a particular embodiment, the system is an Internet Protocol Television (IPTV) system adapted to provide television programming via the network 408 to multiple user devices, such as the media device 410. The IPTV system may be configured to provide content to the media device 410 from the media server 404 via one or more unicast or multicast packet streams to be decoded and buffered at the media device 410 for display at the display device 412. The media server 404 may include one or more network elements of the IPTV system, and the network interface 424 may include a data transmission interface to send a stream of media content via the IPTV system.

The media server 404 includes a processor 422 and a memory 426 accessible to the processor 422. The memory 426 includes data 428 that includes a plurality of user expressions made in response to presentations of segments of media content. For example, the data 428 may include a database including user expression data related to media content. In a particular embodiment, each expression is time indexed to a corresponding portion of the media content. The data 428 also includes a plurality of categories of types of expressions where each expression is associated with one or more categories. The media server 404 also includes a content interface 420 adapted to receive content from the content provider 402. The content may include television programming, video-on-demand programming, pay-per-view programming, or other video, audio or multimedia programming.

The media server 404 includes an advertisement interface 421 adapted to receive advertising content from an advertisement provider 406. The advertising content may be targeted to one or more users based on information available to the media server 404 regarding the particular users targeted. For example, the advertisement content may be selected based on media content watched by or accessed by the user, based on user preference settings of the user, or based on historical interactions with users, such as purchases made by the user via the network 408. The media server 404 also includes a network interface 424 adapted to send the media stream 452 via the network 408 to one or more media devices, such as the representative media device 410.

The media device 410 includes a network interface 430 to receive the media stream 458 from the network 408 and includes a processor 432 to process the media stream 458 for display via a display device 412. The media device 410 includes the memory 438 accessible to the processor 432. In a particular embodiment, the network interface 430, the processor 432, and the memory 438 correspond to the network adapter 220, the processor 201, and the storage 210 of the MPR 124 depicted in FIG. 2. The media device 410 also includes a remote control module 436 adapted to receive control input from a remote control device 414. In a particular embodiment, the memory 438 stores a plurality of user expressions made in response to presentations of segments of media content 440. The expressions may be time indexed to corresponding portions of the media content. Additionally, the memory 438 may include a plurality of categories of types of expressions where each expression is associated with one or more of the categories. For example, user expressions may include textual data such as comments typed or entered by users, facial expressions or body gestures such as may be captured by still or video cameras, audible expressions such as may be captured by a microphone, or other expressions that may provide information regarding a particular viewed segment of the media content 440. Examples of categories may include comedy, horror, and sporting events/highlights.

In operation, the media server 404 may facilitate interactions by users of media devices coupled to the network 408. For example, a user of the representative media device 410 may interact with other users (not shown) by providing input via the remote control device 414 or another input device to comment on or interacting with the media stream 458. Interactive input provided by the user may be stored at the media server 408, at the media device 410, or at a database of expressions that stores interactive input received from all of the users that provide input with respect to the media stream 458.

For example, the media stream 458 may include a particular program of television content and interaction among the users may include comments on the program. Expressions provide by the users may be captured such as by text entry of the users, by microphones or cameras configured to capture users speech, facial expressions, or body language of the users, or via other methods such as interaction with a graphical user interface. The expressions received from the users during the interactions may be saved in the database of expressions and categorized based on the categories that are descriptive of the types of expressions made. For example, expressions indicating that particular content is "funny" may be stored in the category identified as "funny". In another example, expressions related to a sporting event indicating that a score is made may be stored in a "sports highlight" category. The expressions may be time indexed to a particular portion of the media stream that was viewed when the expression is received. Accordingly, the database of expressions may be used to access particular segments of video content or of media content to create a media stream including content related to particular categories of expressions. For example, a user may select one or more particular categories from a plurality of categories of expressions, and the media server 404 may select a group of segments of media content where each segment of the media content in the group is associated with the one ore more selected categories. The media server 404 may then generate a stream of media content 452 that includes each of the segments of media content in the group. The media server may communicate the stream of media content to the media device 410 for display at the display device 412. In another particular embodiment, the media server 404 may communicate the media stream 458 to the media device 410 for recording.

Thus, the media server 404 is adapted to generate a media stream that includes particular content of interest to a user. For example, the media stream may include a "best of highlights" reel from various sporting events that occurred during a specified time period. In another example, the media stream 452 may include a "best of highlights" reel from various comedy programs presented during a specified time period, such as a week or day. For example, the category of user expressions may be selected when a particular threshold number of users express ideas related to the category. For example, where a threshold number of users indicate that a particular portion of media content is "funny", the portion of media content may be associated with a category "funny". Thus, by selecting a category, the user may be able to receive a generated stream of media content that includes only portions of programs that were identified by other viewers (e.g. a minimum threshold number of users) as being associated with that category. For example, the threshold number of viewers may be set at a predetermined amount, such as five hundred viewers that make expressions related to a selected category as the particular portion of the program was presented, or may be set as a percentage of viewers, such as thirty percent of viewers, or may be determined according to particular category type, content type, or based on other factors.

Additionally, the media server 404 may be adapted to provide targeted advertising from the advertisement provider 406 related to the media stream 452. For example, a targeted advertisement may be selected based on the particular category selected by the user to generate the media stream 452. The targeted advertisement content may be inserted into the media stream 452 to provide the targeted advertising to the user along with the media stream. Providing one or more targeted advertisements in the media stream may provide advertisers the opportunity to reach an audience that may have particular interest or affinity in the advertiser's products or services, may and also benefits viewers with information of available goods or services of particular interest to the viewers. Such targeted advertisements may be more effective than untargeted or broadcast advertisements, and thus placement of the targeted advertisements may be used to generate additional revenue for the system provider.

Figure 5:
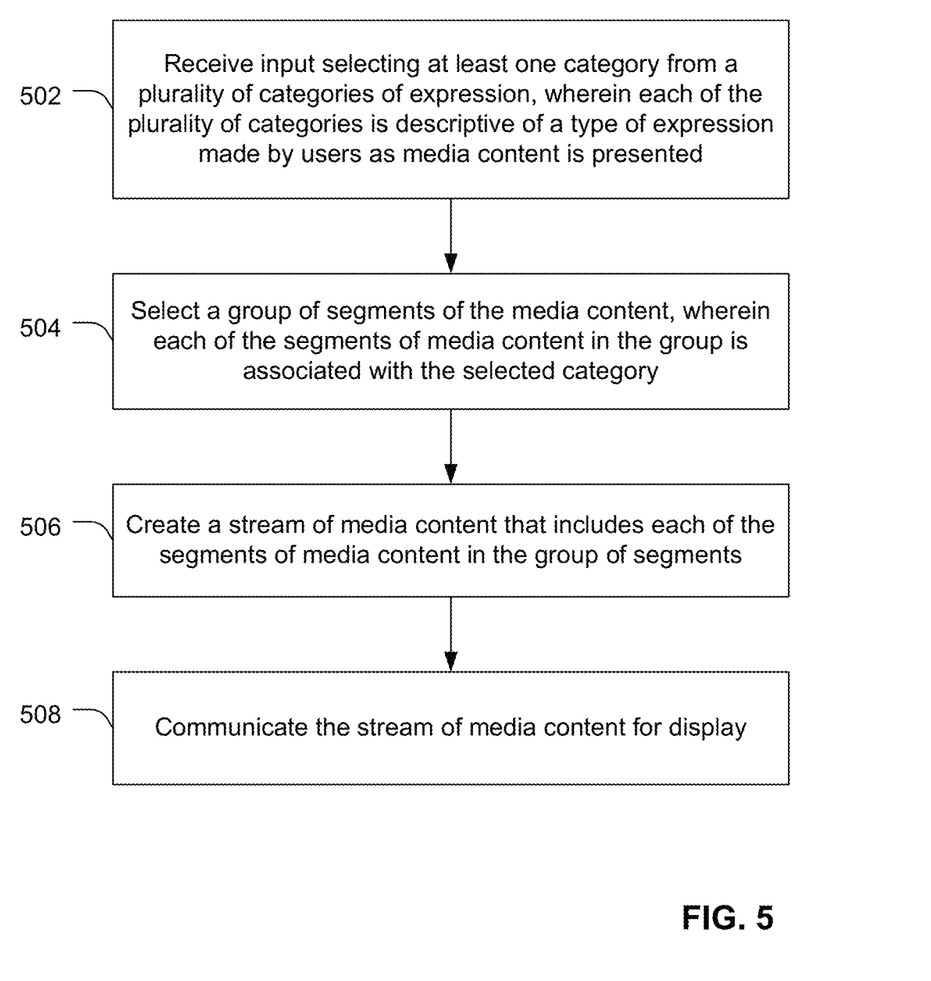
FIG. 5 depicts a flow chart of a first particular embodiment of a method of generating a media stream based on user expression categories.

FIG. 5 depicts a flow chart of a first particular embodiment of a method of creating a media stream. The method includes receiving input selecting at least one category from a plurality of categories of expression at 502. Each of the plurality of categories of expression is descriptive of a type of expression made by a user as media content is presented. For example, user expressions indicating that a particular portion of media content is "scary" may be associated with a category of "horror".

The method also includes, at 504, selecting a group of segments of media content. Each of the segments of media content is in a group that is associated with the selected category. For example, expressions received from users may be analyzed to determine appropriate categories to which the expressions apply. The expressions may be time indexed to portions of media content. Thus, by selecting a particular category of expression, a set or group of segments of media content may be identified and used to generate a personalized media stream.

The method also includes creating a stream of media content that includes each of the segments of media content in the group of segments at 506. The stream of media content may be communicated for display, at 508. According to a particular embodiment, a user can generate a stream of media content including segments of media content that are associated with particular categories of expression. Each of the segments of media content may include all or a portion of a particular television program or other media program.

Figure 6:
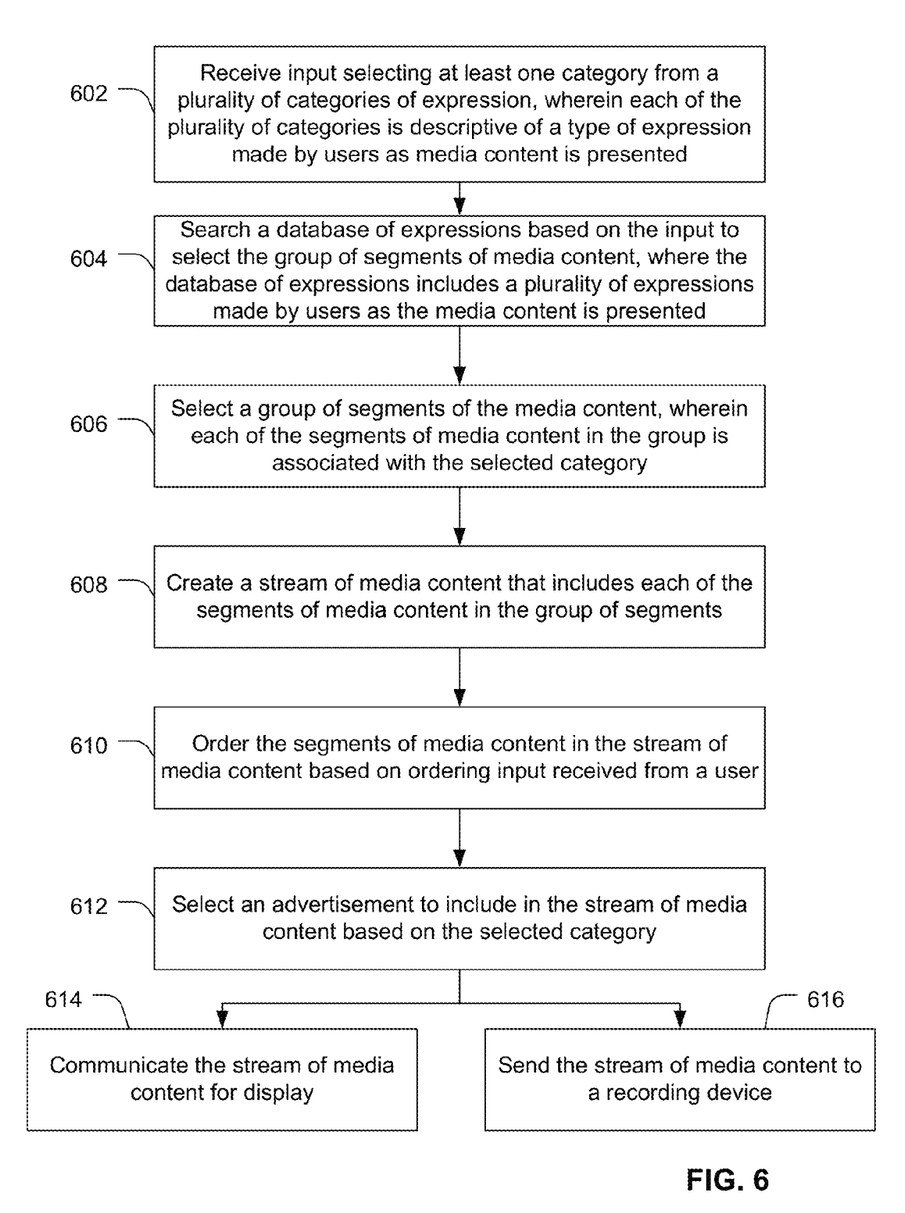
FIG. 6 depicts a flow chart of a second particular embodiment of a method of generating a media stream.

FIG. 6 depicts a second particular embodiment of a method of generating a media stream. The method includes receiving input selecting at least one category from a plurality of categories of expression, at 602. Each of the categories is descriptive of a type of expression made by a user as media content is presented. The method includes searching a database of expressions based on the input to select a group of segments of media content, at 604. For example, the database of expressions may include expressions made by users that were time indexed to particular media content and categorized based on the type of expression. The method also includes selecting a group of segments of the media content, at 606. Each of the segments of the media content in the group is associated with the selected category. The method further includes creating a stream of media content that includes each of the segments of the media content in the group of segments, at 608. The method includes ordering the segments of the media content in the stream based on ordering input received from a user, at 610. The method also includes selecting an advertisement to include in the stream of media content based on the selected category at 612. In a particular embodiment, the method includes communicating the stream of media content for display, at 614. In another particular embodiment, the method includes sending the stream of media content to a recording device, such as a digital video recorder (DVR) or network based DVR at 616.

Thus, users may select and receive media content based on the users' preferences and to receive targeted advertisements appropriate for viewers of the content. The media content may be selected based on expressions provided by or recorded from other viewers and may be deemed a more accurate categorization by users than other methods of categorization. Users may therefore request and receive specifically categorized media content for enjoyment that is organized based on the requesting user's ordering criteria. For example, the user may elect to have the media stream ordered based on the number of expressions associated with the category, based on other criteria or metadata associated with the content, or any combination thereof. In addition, the media stream may not include entire programs, such as entire television programs, and may instead include, for example, a video clip that is a subset of one of a plurality of television programs. To illustrate, a "sports highlights" category may include video clips of exciting segments of multiple televised games based on user expressions without including the entire games.

Figure 7:
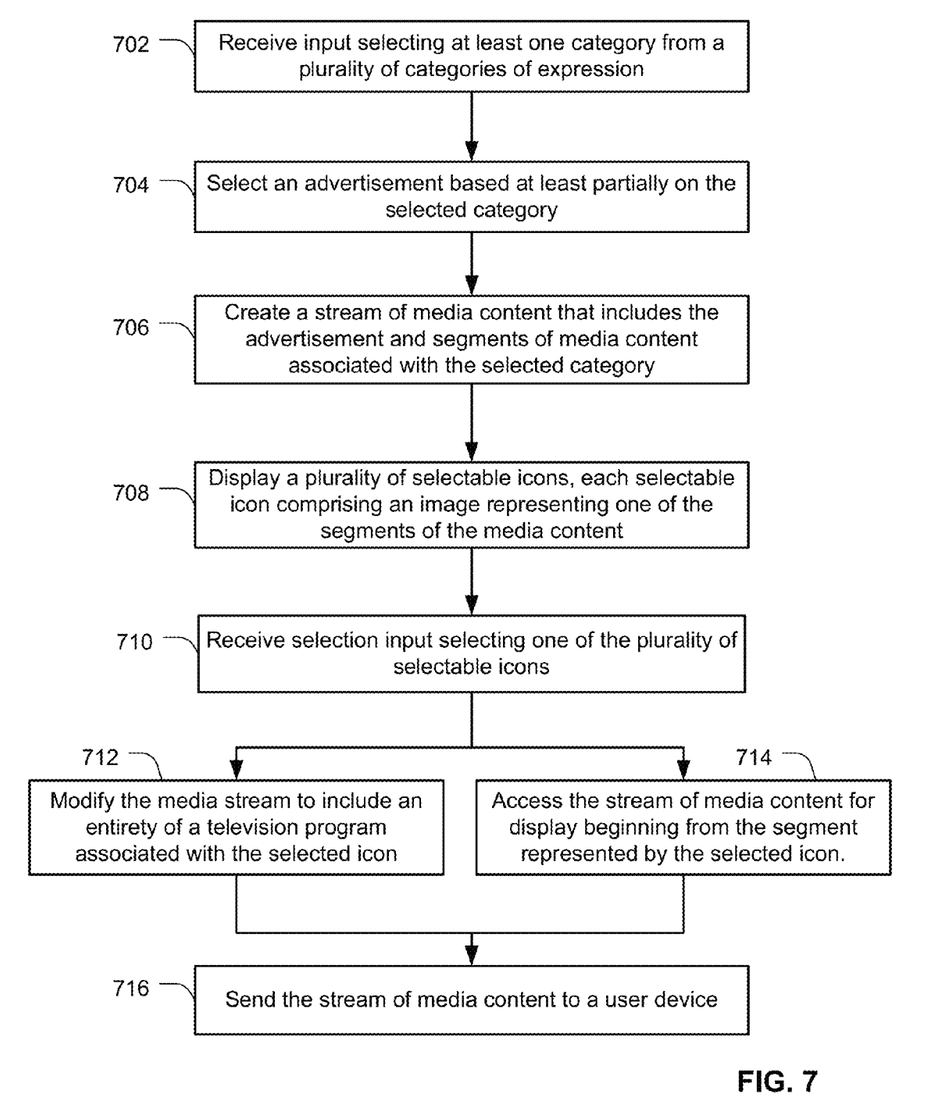
FIG. 7 depicts a flow chart of a third particular embodiment of a method of generating a media stream.

FIG. 7 depicts a third particular embodiment of a method to generate a media stream. The method includes receiving user input selecting at least on category from a plurality of available categories of expression, at 702. Each of the plurality of categories is descriptive of a type of expression made by users as the content is presented. The method includes selecting an advertisement based at least partially on the selected category, at 704. The method further includes creating a stream of media content that includes the advertisement and the segments of media content associated with the selected category at 706.

The method may also include displaying a plurality of selectable icons, at 708. Each of the selectable icons may include an image representing one of the segments of the media content. The method may also include receiving selection input, selecting one of the plurality of selectable icons, at 710. In response to selection of the one or more selectable icons, the method may include modifying the media stream to include an entirety of a television programs associated with the selected icon, at 712. For example, the segments of media content may include portions of television programs. Thus, the stream of media content may include segments or portions of individual programs, and no particular program may be represented in its entirety.

In another particular embodiment, one or more programs are represented in their entirety, but not all programs are represented in their entirety. By selecting one of the selectable icons, the media streams may be modified to include an entire program associated with the selected icon. The modified media stream may be sent to a user device for display, at 716. In another particular embodiment, in response to receiving selection input selecting one or more selectable icons, at 710, the method includes accessing the stream of media content for display beginning at the segment represented by the selected icon, at 714. For example, where the stream of media content includes a plurality of segments of media content, the user may desire to advance to or to start from a particular segment. By selecting a user selectable icon associated with a particular segment, the media stream may be advanced to the content associated with the selected icon. The method may further include sending the stream of media content to a user device for display or for recording, at 716.

Figure 8:
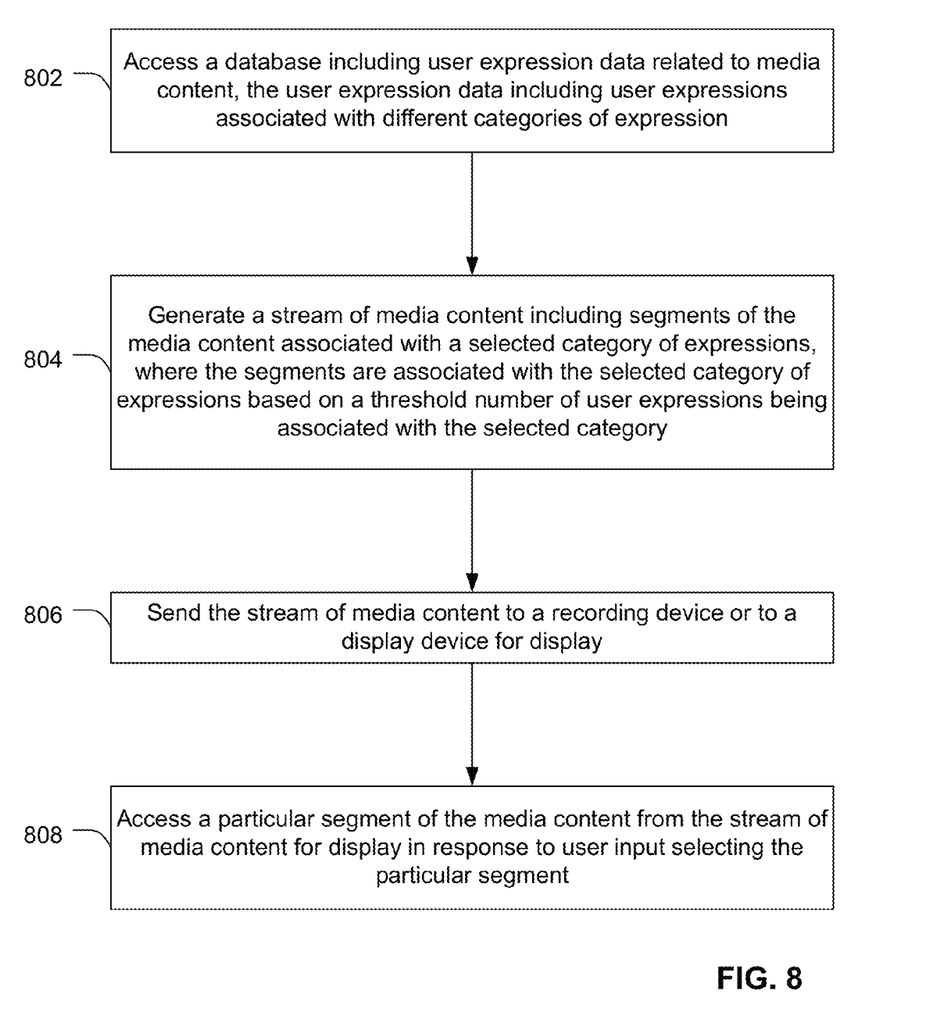
FIG. 8 depicts a flow chart of a fourth particular embodiment of a method of generating a media stream.

FIG. 8 depicts a flow chart of a fourth particular embodiment of a method of generating a media stream. The method includes accessing a database including user expression data related to media content, at 802. The user expression data includes user expressions associated with different categories of expression. The method includes generating a stream of media content including the segments of the media content associated with a selected category of expression, at 804. The segments are associated with the selected category of expression based on a threshold number of user expressions being associated with the selected category. For example, a segment may be associated with a selected category when a predetermined number of user expressions corresponding to that segment are associated with the selected category. To illustrate, when a threshold number of viewer expressions for a segment of a movie indicate that the segment is frightening, the segment may be selected with a "horror" category. The method also includes sending the stream of media content to a recording device or to a display device for display, at 806. In a particular embodiment, the method further includes accessing a particular segment of the media content from the stream of media content for display and in response to the user input selecting the particular segment at 808. For example, each segment of the media content may be represented by a user selectable icon. By selecting one of the user selectable icons (e.g. using a remote control device), the user may select a particular segment of media content for display.

Figure 9:
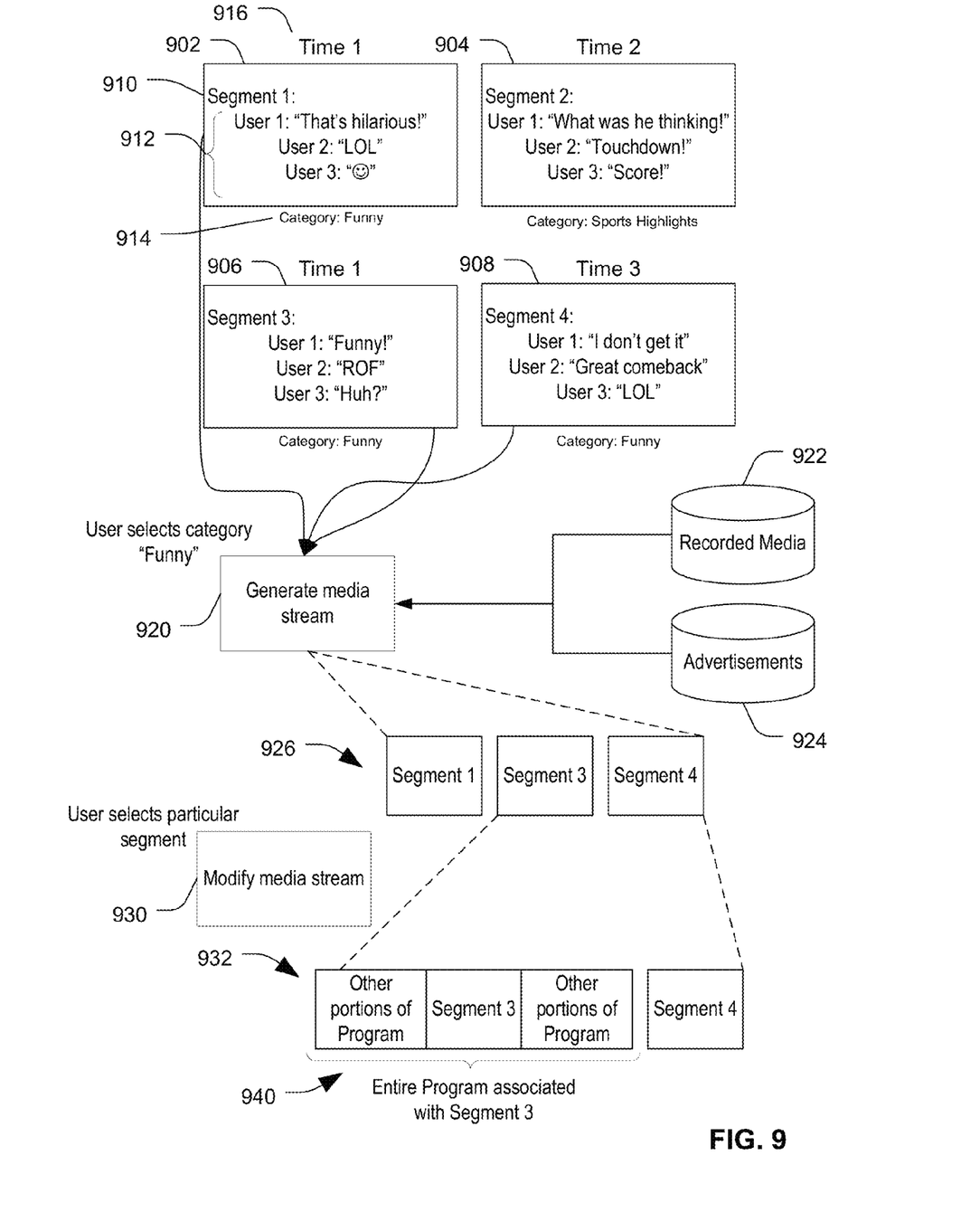
FIG. 9 depicts a data flow diagram of a particular embodiment of a method of generating a media stream and facilitating user interacting with the media stream.

FIG. 9 depicts a data flow diagram of particular embodiment of a method of generating a media stream and interacting with the media stream. The method includes storing a plurality of data records related to segments of media content. The data records may be stored in an expression database. A first representative data record 902 is associated with a first segment of media content 910 and includes a plurality of user expressions 912 associated with the first segment of media content 910. The first data record 902 is further associated with a time stamp 916 that relates the time that the user expressions were received with a particular portion of media content, in particular, the time of display of the first segment 910. The first data record 902 is further associated with a category 914. In particular, based on the user expressions 912 indicating that the particular segment 910 is "funny", the category associated with the data record is the category "funny". Additionally, a second data record 904 identifies user expressions associated with a second segment of media content displayed at a second time. The user expressions associated with the second segment of media content and the second data record 904 indicate that the second segment is recorded as a "sports highlight". Thus, the category associated with the second data record is "sports highlights". A third data record 906 also includes user expressions indicating that the media content associated with the data record is "funny", and the third data record is associated with the category "funny". A fourth data record, 908, is associated with a fourth segment of media content and with user expressions indicating that the media content is "funny". Thus, the fourth data record 908 is associated with the "funny" category of user expression. The first data record 902 and the third data record 906 are associated with a time index indicating that user expressions related to the first segment of the media content and the third segment of the media content were received for display at about the same time. For example, the first segment of media content may be associated with a portion of a first television program and the third segment of media content may be associated with a portion of a second television program. The first and second television programs may have been broadcast or otherwise displayed to the users at approximately the same time.

In a particular embodiment, a user may select a category, such as the category "funny", from a list of available categories. In response to a user selection of the category "funny", the system may generate a media stream including segments of media content related to the category at 920. In the particular embodiment illustrated, the first segment 902, the third segment 906, and the fourth segment 908 are selected to generate the personalized media content based on the expression category. The method may access the media content at a recorded media database 922. Additionally, one or more advertisements may be selected based on the selected category and/or based on other information related to the user from an advertisement database 924. For example, multiple targeted advertisements may be selected to include with the selected segments.

A media stream 926 may be generated based on the data records 902, 906, 908, the recorded media 922, and the advertisement database 924. The media stream may be sent to a user device for display or recording. In a particular embodiment, while observing the content of the media stream, the user may select a particular segment and the media stream may be modified, at 930. For example, the media stream may be modified to start at a different segment than the first segment. In another particular embodiment as illustrated in FIG. 9, the media stream is modified by accessing additional portions of a particular program. For example, when a user selects the third segment, the media stream may be modified, as illustrated at 932, to include the entire program associated with the third segment 940. The media stream may continue after displaying the entire program associated with the third segment to show the remaining portions of the media stream, such as illustrated in segment four.

Figure 10:
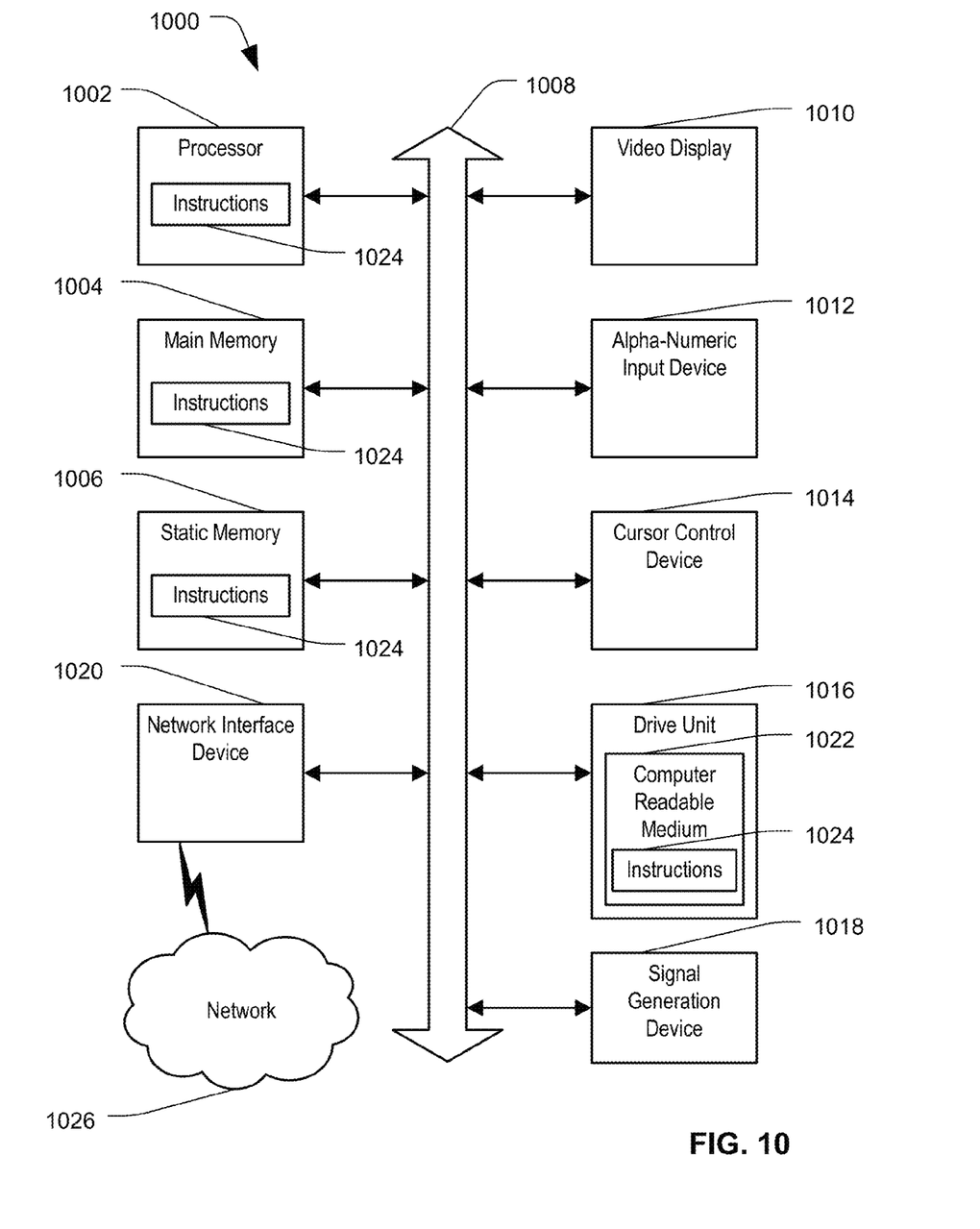
FIG. 10 depicts an illustrative embodiment of a general computer system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. For example, the computer system 1000 may include or be included within any one or more of the processors, computers, communication networks, servers, media processing resources, or media device, as shown in FIGS. 1-4.

In a networked deployment, the computer system may operate in the capacity of a server or as a client user computer in a server-client user network environment, or as a peer computer system in a peer-to-peer (or distributed) network environment. The computer system 1000, or portions thereof, can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a control system, a camera, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video, and data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), a projection television display, a flat panel display, a plasma display, a solid state display, or a cathode ray tube (CRT). Additionally, the computer system 1000 may include an input device 1012, such as a remote control device having a wireless keypad, a keyboard, a microphone coupled to a speech recognition engine, a camera such as a video camera or still camera, or a cursor control device 1014, such as a mouse device. The computer system 1000 can also include a disk drive unit 1016, a signal generation device 1018, such as a speaker or a remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable medium or other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) as well as television standards (e.g., SDTV, NTSC, PAL, SECAM, HDTV, ATSC, DVB-T, ISDB-T), represent examples of the state of the art. Such standards are periodically superseded by faster or more efficient standards having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all modifications, enhancements, and other embodiments, that fall within the true spirit and scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
receiving, at a user device from a media server, a media stream that includes a group of segments of media content associated with a user-selected category, wherein the group of segments includes a first segment corresponding to a portion of a first program and a second segment corresponding to a portion of a second program;
receiving, at the user device, user input during playback of the media stream, the user input indicating the first segment;
sending data based on the user input to the media server; and
receiving, at the user device from the media server, a modified stream based on the user input, wherein the first segment is replaced by an entirety of the first program in the modified stream, and wherein the modified stream includes the second segment subsequent to the entirety of the first program.

2. The method of claim 1, wherein the modified stream is received after the media server stops sending the media stream.

3. The method of claim 1, further comprising, before playback of the media stream, transmitting, from the user device to the media server, second data based on second user input indicating an order of segments.

4. The method of claim 1, wherein the user-selected category is included in a plurality of categories, and wherein each category of the plurality of categories is descriptive of a particular type of expression of a plurality of expressions made by users as the media content is presented.

5. The method of claim 1, further comprising recording the modified stream to a memory coupled to the user device.

6. The method of claim 1, wherein the media stream includes an advertisement.

7. The method of claim 1, wherein the user device comprises a set-top box, a video gaming device, a computing device or an electronic device.

8. The method of claim 4, wherein the particular type of expression includes a facial expression, a body gesture, or an audible expression.

9. The method of claim 4, wherein the particular type of expression is provided to the media server via a user input device.

10. A computer-readable storage device including instructions that, when executed by a processor, cause the processor to perform operations comprising:
receiving, from a media server, a media stream that includes a group of segments of media content associated with a user-selected category, wherein the group of segments includes a first segment corresponding to a portion of a first program and a second segment corresponding to a portion of a second program;
receiving user input during playback of the media stream, the user input indicating the first segment;
sending data based on the user input to the media server; and
receiving, from the media server, a modified stream based on the user input, wherein the first segment is replaced by an entirety of the first program in the modified stream, and wherein the modified stream includes the second segment subsequent to the entirety of the first program.

11. The computer-readable storage device of claim 10, wherein the operations further comprise sending, to the media server, a second selection of the user-selected category.

12. The computer-readable storage device of claim 10, wherein the operations further comprise receiving an expression via a user input device.

13. The computer-readable storage device of claim 10, wherein the operations further comprise, before playback of the media stream, sending second data based on second user input indicating an order of segments to the media server.

14. The computer-readable storage device of claim 12, wherein the operations further comprise, prior to receiving the media stream, sending the expression to the media server, wherein the group of segments are selected based on the expression.

15. The computer-readable storage device of claim 12, wherein the media stream includes an advertisement.

16. A system comprising:
a processor; and
a memory, the memory including instructions that, when executed by the processor, cause the processor to execute operations comprising:
receiving, from a media server, a media stream that includes a group of segments of media content associated with a user-selected category, wherein the group of segments includes a first segment corresponding to a portion of a first program and a second segment corresponding to a portion of a second program;
receiving user input during playback of the media stream, the user input indicating the first segment;
sending data based on the user input to the media server; and
receiving, from the media server, a modified stream based on the user input, wherein the first segment is replaced by an entirety of the first program in the modified stream, and wherein the modified stream includes the second segment subsequent to the entirety of the first program.

17. The system of claim 16, wherein the operations further comprise, before playback of the media stream, sending second data based on second user input indicating an order of segments to the media server.

18. The system of claim 16, wherein the user-selected category is included in a plurality of categories, and wherein each category of the plurality of categories is associated with a particular expression by a plurality of users.

19. The system of claim 16, wherein the operations wherein the media stream includes an advertisement.

20. The system of claim 18, wherein each segment of the group of segments is selected based on the particular expression.

* * * * *